United States Patent [19]
Layton

[11] Patent Number: 5,313,865
[45] Date of Patent: May 24, 1994

[54] TURRET STATION RESTORATION APPARATUS

[75] Inventor: Richard D. Layton, North Salt Lake, Utah

[73] Assignee: Advanced Turret Engineering Co., Bountiful, Utah

[21] Appl. No.: 960,045

[22] Filed: Oct. 13, 1992

[51] Int. Cl.$^5$ .......................... B26F 1/00; F16C 29/02
[52] U.S. Cl. .......................................... 83/635; 384/30
[58] Field of Search .......................... 82/159, 160, 161; 83/635, 627; 384/30

[56] References Cited

U.S. PATENT DOCUMENTS

| | | | |
|---|---|---|---|
| 3,130,623 | 4/1964 | Nesbitt | 83/635 |
| 3,299,760 | 1/1967 | Cobb, Jr. | 83/635 |
| 4,240,314 | 12/1980 | Teeslink | 83/635 |
| 4,756,630 | 7/1988 | Teeslink | 384/30 |

Primary Examiner—Mark Rosenbaum
Assistant Examiner—John M. Husar
Attorney, Agent, or Firm—Lynn G. Foster

[57] ABSTRACT

Apparatus for restoring a turret table toolholder guide station. The apparatus comprises a plurality guide rings each comprising precisely molded or machined inner and external circumferential surfaces, one guide ring being installed into each of the channels. Each guide ring has a portion of the ring circumference removed for facile, snap-in installation, but each guide ring retains a sufficient portion thereof that a toolholder inserted for guidance in the station is in substantially continuous, precise toolholder guiding contact with the inner circumference of the guide ring.

5 Claims, 2 Drawing Sheets

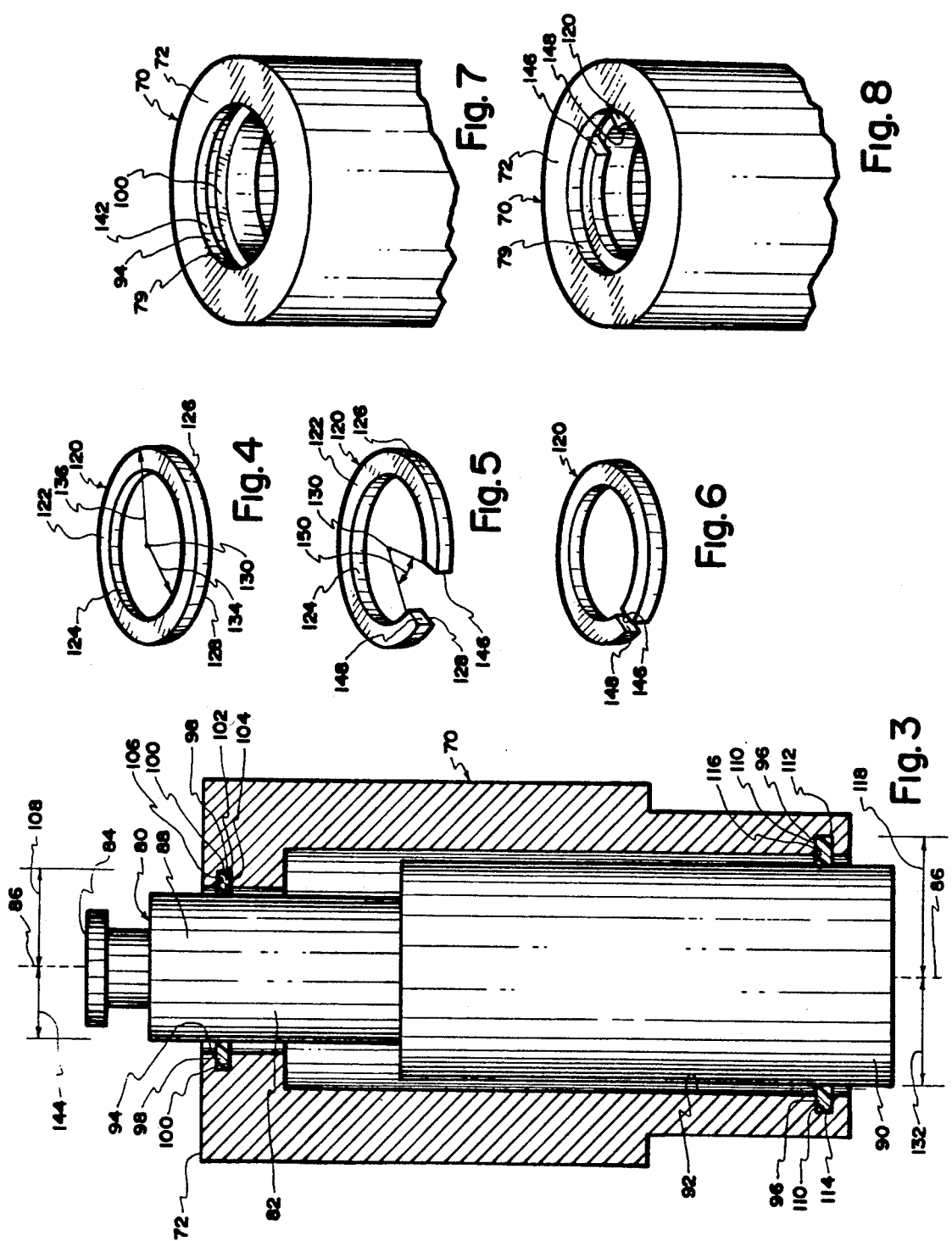

TURRET STATION RESTORATION APPARATUS

FIELD OF INVENTION

This invention relates to toolholders and stations of turret tables and more particularly to apparatus and methods for extending the useful life of the toolholders and stations.

BACKGROUND AND DESCRIPTION OF RELATED ART

After repeated use, a station which is an aligning guide for a toolholder on a turret table, becomes enlarged, causing the tool holder to be relatively loosely guided and poorly aligned. Poor alignment of the toolholder results in destructive contact between the associated tool and die in a punching operation and ultimate battering and destruction of the tool and die.

Due to the expense of the tooling and difficulty of replacement of such stations and guides on the turret, it is highly desirable to restore the station without replacing or changing the toolholder or dismantling and reboring. However, any such restoration must provide new controlling surfaces between the toolholder and the station to protect the tool and die from misguided contact.

Two somewhat different methods for refurbishing a station are disclosed in U.S. Pat. Nos. 4,240,314 (Teeslink) and 4,756,630 (Teeslink). As described in U.S. Pat. No. 4,756,630, the method of U.S. Pat. 4,240,314 involves the drilling of spaced side bores in the toolholder wall and the insertion of plugs of resilient material into the bores to position the toolholder away from the wall of the station. The plugs extend outwardly into the toolholder bore sufficiently so that the toolholder compresses the resilient plugs tightly into the side bores. The toolholder reciprocates across ends of the plugs. The small plugs provide limited bearing surface and wear soon occurs requiring the replacement of the plugs, although their resilient spring back extends the useful life somewhat. The plastic tends to creep under constantly applied load so that the advantage of the compression is largely lost. This method is therefore of severely limited value, either for repair or for original equipment.

U.S. Pat. No. 4,756,630 endeavors to ameliorate the application of spaced supports within a station by replacing spaced plugs with longitudinal wear strips. The wear strips are retained within keyways machined in the sides of a refurbished station. To be effective, toolholder bearing surfaces of the strips must provide close but clearing surfaces which are symmetrically disposed about the longitudinal axis of the toolholder. Preferably, the strips and keyways are dovetailed. Keyways are taught to be provided by broaching the cylindrical walls of the station using special tools, in a first step as a rectangular keyway and in a second step as a dovetail using a dovetail shaped broach. To make matching strips, rectangular blanks of plastic bearing material are forcibly intruded lengthwise into the dovetail thereby removing excess material and forcing the strip to fit. Finally the radially protruding strip is formed by longitudinal broaching. While no dismantling of an associated turret is required, the process requires a plurality of high precision and involved steps and specialized tooling as recited above to refurbish a station.

BRIEF SUMMARY AND OBJECTS OF THE INVENTION

In brief summary, this novel invention alleviates all of the known problems related to providing a refurbished station used to precisely guide a toolholder on a turret. With the foregoing in mind, the prior art discloses plugs or strips which provide bearing support over a comparatively small portion of the lateral circumference of a toolholder guided within the station. The plugs and strips are installed into the station in a series of individual steps providing an opportunity for an accumulation of machining or broaching tolerances which may produce undesirable offsets in resulting guidance accuracies. In addition U.S. Pat. No. 4,756,630 discloses a method which requires the internal surface of the refurbished station be a cylinder having a constant internal diameter throughout the length of the internal surface of the cylinder.

This invention comprises a hollow cylindrical station into which a plurality of transverse channels are grooved for placement of guide rings. At least two channels disposed along the longitudinal surface of the station, provide channels wherein the guide rings are disposed. Each channel in the station is grooved to provide a vertical reference surface by a precise circular cut, the center of which is located along the desired track of the longitudinal axis of the toolholder. At least two channels are provided at critical toolholder aligning sites. As an example, in one embodiment, at least one channel is disposed in the superior quadrant of the station and at least one other channel is disposed in the inferior quadrant of the station.

Each guide ring is sized along an external circumference to accurately coapt within an associated channel against the vertical reference surface of the channel. When disposed within the channel, the inner surface of the guide ring establishes a toolholder guide supporting surface. The inner surface of the guide ring is sized to provide a high precision guiding surface across which the toolholder moves and is guided. Before installing each guide ring into an associated channel, a small fraction of each guide ring is removed to permit the ring to be circumferentially compressed against structural memory of the ring. So compressed, each guide ring is introduced into the station and inserted into the channel whereat, after release of the compression, the structural memory of the guide ring causes the external circumference of the guide ring to closely juxtapose the vertical reference surface of the channel. When in place, the guide ring provides precise support of an in-place toolholder over a substantial portion of the circumference of an associated segment of the toolholder.

Accordingly, it is a primary object to provide a method for restoring a turret toolholder station to accurately guide a toolholder without removing the station from an associated turret.

It is a further primary object to provide a method for accurately positioning, relative to a toolholder and travel path of the toolholder, at least two guide rings within the turret station such that each guide ring is disposed about the circumference of the toolholder to precisely guide reciprocal movement of the toolholder.

It is a main object to provide a restored turret station comprising at least two circumferentially disposed guide rings for precisely guiding the toolholder within the station.

It is an important object to provide guide rings interposed within grooved channels in the station which are disposed to guide the toolholder and which are facilely replaceable when increasingly inaccurate guidance as a result of wearing of the in-place guide rings threatens damage to the toolholder and an associated die.

These and other objects and features of the present invention will be apparent from the detailed description taken with reference to accompanying drawings.

BRIEF DESCRIPTION OF THE DRAWINGS

FIG. 3 is a section taken through lines 3—3 of FIG. 2.

FIG. 4 is a perspective of a guide ring.

FIG. 5 is a perspective of the guide ring of FIG. 4 with a section removed.

FIG. 6 is a perspective of the guide ring of FIG. 5 compressed to a smaller diameter.

FIG. 7 is a perspective of a portion of the toolholder station with no toolholder in place and revealing a horizontal groove.

FIG. 8 is a perspective of the portion of the toolholder station of FIG. 7 with a guide ring disposed in the horizontal groove.

DETAILED DESCRIPTION OF THE ILLUSTRATED EMBODIMENTS

Figure 1:
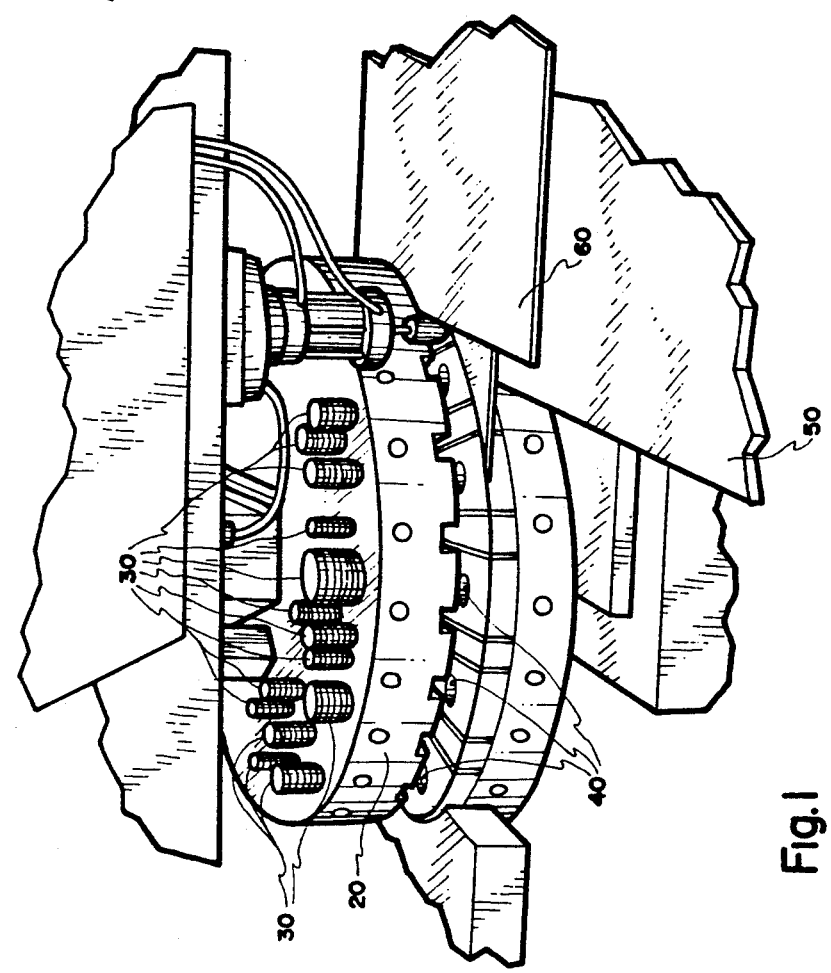
FIG. 1 is a perspective of a portion of a punching machine showing a turret table which comprises a plurality of turret stations.

In this description, the comparative term superior is a positional reference indicating greater elevation. Inferior indicates lower elevation. Reference is now made to the embodiments illustrated in FIGS. 1-8 wherein like numerals are used to designate like parts throughout. In FIG. 1 a punching machine 10 is seen to comprise a turret table 20. Turret table 20 comprises a plurality of toolholder stations, generally designated 30 and associated die stations, generally designated 40. Also seen in FIG. 1 is a work surface 50 and a work piece 60 disposed on work surface 50. It is highly desirable to restore toolholder stations 20 while the toolholder stations reside on turret table 20 to eliminate effort required to tear down and reconstruct the turret table 20 during a refurbishment process.

Figure 2:
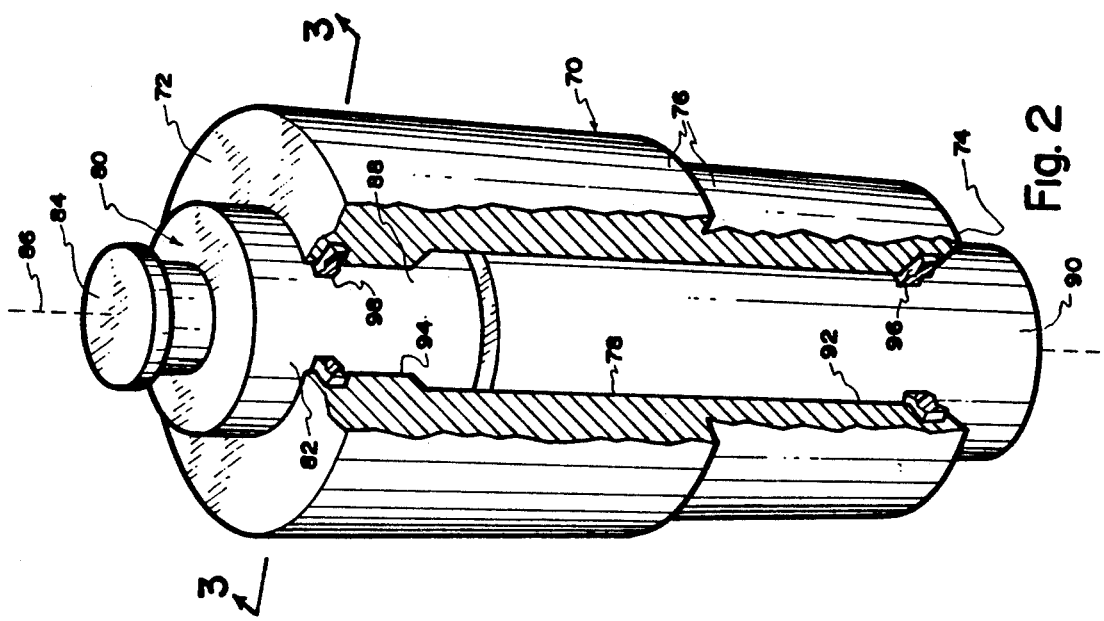
FIG. 2 is a perspective of a toolholder station, partially cut away to expose a toolholder held and precisely positioned in the station by two guide rings.

A representative embodiment of a refurbished toolholder station 70, with a portion of toolholder station 70 broken away for clarity of presentation is seen in FIG. 2. Toolholder station 70 comprises a top surface 72, a bottom surface 74, an exterior surface 76 and an interior surface 78 of a bore 79 which describe an irregular hollow cylinder having stepped interior and exterior surfaces. While such toolholder station 70 cylinders are often regular and do not comprise stepped surfaces, this invention provides a facile method for handling such irregular cylinders and therefore the representative embodiment described herein provides such an example.

A toolholder 80 is disposed within the hollow cylinder of toolholder station 70 and comprises an essentially solid cylindrical body 82 and a tool attachment, not shown. Toolholder 80 further comprises a knob 84, superiorly disposed atop body 82. Know 84 is the recipient of actuating force as normally applied by means of a hydraulic piston, a cam or like performing actuator to force toolholder 80 toward a die. A dashed centerline 86 plots the longitudinal axis of toolholder 80.

Toolholder body 82 is seen to comprises two integrally connected cylinders 88 and 90, cylinder 88 comprising a smaller radius of curvature that cylinder 90. A requirement is thereby imposed upon toolholder station 70 to have the internally disposed cylindrical surface 78 comprise an inferior surface 92 in stepped relation to a superior surface 94 to provide a complementary juxtaposed relationship with the surfaces of cylinders 90 and 88, respectively.

In new equipment, it is common for surfaces 92 and 94 provide a guide for cylinders 88 and 90. However, alloy material from which toolholder 80 is made is, by design, normally much harder than material from which toolholder station 70 is made. For this reason, toolholder station 70 becomes enlarged through use causing toolholder 80 to fit loosely within toolholder station 70 with resulting damage to toolholder 80 and an associated die due to off-longitudinal axis collisions between a tool of toolholder 80 and the associated die.

When such wear permits out-of-tolerance misguidance of toolholder 80 by toolholder station 70, it becomes necessary to restore either toolholder station 70, toolholder 80 or both. Due to the large amount of labor normally associated with disassembling and reassembling a turret table 20, it is greatly preferred to retrofit the toolholder stations 40 and 70 while resident upon turret table 20. It is also preferred to retrofit only each toolholder station 40 and 70, while leaving each toolholder 80 unchanged.

As seen in the embodiment of FIGS. 2 and 3, the invention comprises a plurality of guide rings disposed within bore 79. In the embodiments shown in FIGS. 2 and 3, only two guide rings 96 and 98 are required, as the invention is operative with only two guide rings. However, a larger number of guide rings, disposed inside bore 79 and providing guiding support in lieu of interior surfaces 92 and 94 may be used within the scope of the invention.

Best seen in FIG. 3, a circular channel 100 is grooved through interior surface 94 of toolholder 70. Channel 100 comprises an interior vertical cylindrical surface 102, an inferior horizontal surface 104 and a superior horizontal surface 106. The depth of channel 100 relative to surface 102 is carefully and precisely grooved to a predetermined depth determined by the length of measurement line 108 relative to toolholder centerline 86. Such methods of measurement and machining are currently in use and well known in the art. By this method, vertical surface 102 becomes a reference surface relative to centerline 86.

In similar fashion, a circular channel 110 is grooved through interior surface 92 of toolholder 70. Channel 110 comprises an interior vertical cylindrical surface 112, an inferior horizontal surface 114 and a superior horizontal surface 116. The depth of channel relative to surface 112 is carefully and precisely grooved to a predetermined depth as determined by the length of measurement line 118 relative to toolholder centerline 86. As earlier indicated, such methods of machining are current in use and well known in the art. Like vertical surface 102, by this method, vertical surface 112 becomes a reference surface relative to centerline 86.

Reference is now made to FIGS. 4 and 5 wherein a guide ring, generally designated 120, is seen. As seen in FIG. 4, guide ring 120 comprises a top surface 122, an internal surface 124, and external surface 126 and a bottom surface 128. Surfaces 122 and 128 are essentially parallel and planar and are orthogonally disposed to surfaces 124 and 126. Surfaces 124 and 126 are machined or molded to precise previously determined measurements and are essentially circular. Surfaces 124 and 126 comprise a common center of curvature 130.

Referring once more to FIG. 3 and using channel 110 as an example, inferior cylinder 90 of toolholder 80 comprises a radius of curvature 132 radiating from longitudinal axis 86. A radius 134 of circular surface 124, seen in FIG. 4, is formed to be essentially the same as radius of curvature 132, such that toolholder 80 is precisely contained when sliding therethrough. In this manner, a precisely positioned and retained guide ring 120 acts as an accurate guide for toolholder 80.

Continuing to use channel 110 as an example, the length of measurement line 118, which establishes the location of reference vertical surface 112, is essentially the length to of a radius 136 from center 130 to circular surface 126. Thereby the width of guide ring 120 is defined to be the difference between radii 134 and 136. The thickness of guide ring 120 is formed to fit within channel 110. Different materials and widths used to form guide ring 120 may require an accepting channel, such as channel 110, to be increased or decreased in thickness.

Guide ring 120 is prefereably made from synthetic resinous material having a high modulus of elasticity coupled with great strength, stiffness and toughness. In addition, the material is preferred to have a low coefficient of friction and good bearing characteristics and is preferably self lubricating. It is also preferred that the material have a relatively high melting point and low moisture absorption for close-tolerance use. As well, the material should be easy to machine. An example of such a material is an acetal based compound called POLYPENCO ACETAL, a registered trademark of The Polymer Corporaton, an NV DSM Company, and available from Regional Supply Company, 3571 South 300 West, Salt Lake City, Utah 84115.

A method of insertion of a guide ring 120 into a channel is seen in FIGS. 5-8. A portion of the superior end of toolholder station 70 is seen in FIG. 7. Channel 100 is disposed within the expanse of surface 94 and removed from top surface 72 a width of a cylindrical inner surface 142, disposed between top surface 72 and channel 100. The width of cylindrical surface 142 is determined by the support requirements of toolholder 80 within toolholder station 70. In this embodiment, the width of cylindrical surface 142 is approximately the thickness of guide ring 120. To install guide ring 120 into channel 100, guide ring 120 must be machined or molded to be the dimension of guide ring 100 such that the radii 136 and 134 of guide ring 120 correspond to the measurement line 108 and a measurement line 144, seen in FIG. 3, respectively. Measurement line 144 represents the radius of curvature of superior cylinder 88. In the described embodiment, the thickness of guide ring 120 is approximately 0.25 centimeters.

As seen in FIG. 5, guide ring 120 has a section removed exposing two ring ends 146 and 148, separated by an angle 150. In this embodiment, angle 150 is approximately 30°, however the angle may change within the scope of the invention, based upon the size and material of guide ring 120 and the distance of a channel from an accessible bore opening such as the distance from top surface 72 to channel 100 into which guide ring 96 is installed in FIG. 8. Before inserting guide ring 120 into bore 79, ends 146 and 148 are compressed against structural elastic memory of guide ring 120 until ends 146 and 148 are juxtaposed together thereby reducing the effective diametral distance between sides of ring 120. By means of such compression, guide ring 120 is introduced into bore 79 and further into channel 100.

Once inserted, compression of guide ring 120 is released and the structural elastic memory causes circular surface 126 to engage juxtaposed vertical surface 102 thereby providing a precisely positioned guiding inner surface 124 for cylindrical surface 88 and body 82 of toolholder 80. With only 30° removed from the circumference of guide ring 120, cylindrical surface 88 is and therefore body 82 is supported about 330° degrees (or eleven twelfths) of the circumference, which is defined to be substantially the all or substantially the entirety of the circumference of body 82.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A facilely reparable and maintainable turret table toolholder guide station comprising:
   a vertical bore centrally inaccessible in which a toolholder having predetermined diameter is generally concealed and reciprocably guided, said bore comprising a cylindrical wall of at least one predetermined diameter in which at least two generally concealed grooves are horizontally disposed; wherein said cylindrical wall forming the vertical bore comprises a stepped bore comprising an upper cylindrical section having a first diameter and a lower cylindrical section having a second diameter, said first and second diameters being of essentially different longitudinal lengths to accomodate the stepped configuration of the toolholder and
   at least two shape-retaining removable toolholder generally concealed guide annular wear strips one disposed in each groove and each having a predetermined diameter less than the adjacent diameter of the cylindrical wall and substantially the same as the adjacent diameter of the toolholder thereby providing a substantially continuous contact only between each replaceable annular wear strips and the toolholder.

2. A turret table station according to claim 1 wherein said annular wear strips comprise synthetic resinous material.

3. A turret table station according to claim 2 wherein said synthetic resinous material comprises an acetal based compound.

4. A turret table station according to claim 1 wherein said annular wear strips comprise at least one ring which is discontinuous across a relatively small fraction of the annular length thereof.

5. A turret table station according to claim 1 wherein said annular wear strips comprise different diametral sizes.

* * * * *